No. 613,208. Patented Oct. 25, 1898.
W. C. JOHNSON.
MEANS FOR SEPARATING FIBER FROM COTTON SEED HULLS.
(Application filed Oct. 8, 1897.)
(No Model.) 2 Sheets—Sheet 1.
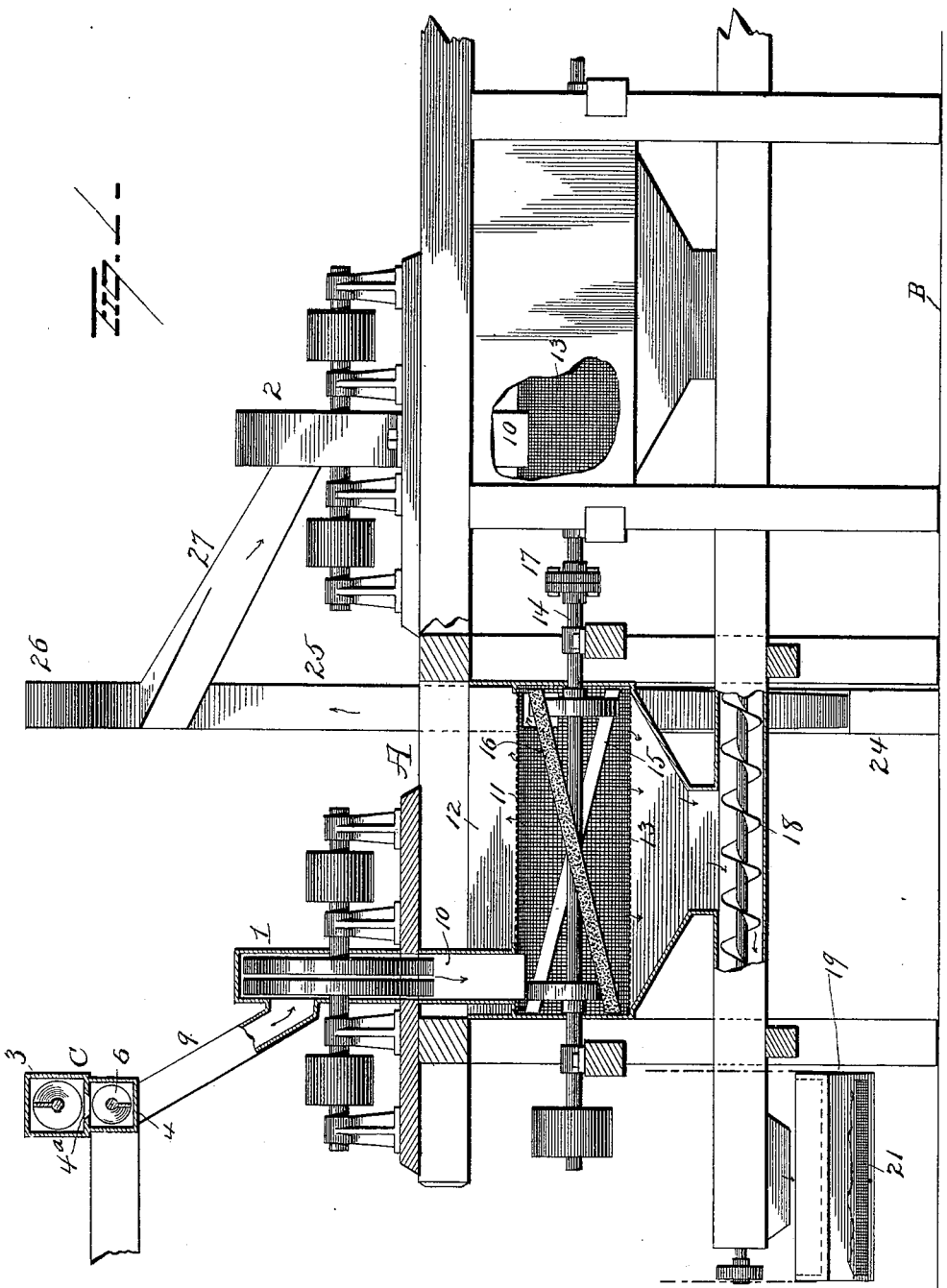

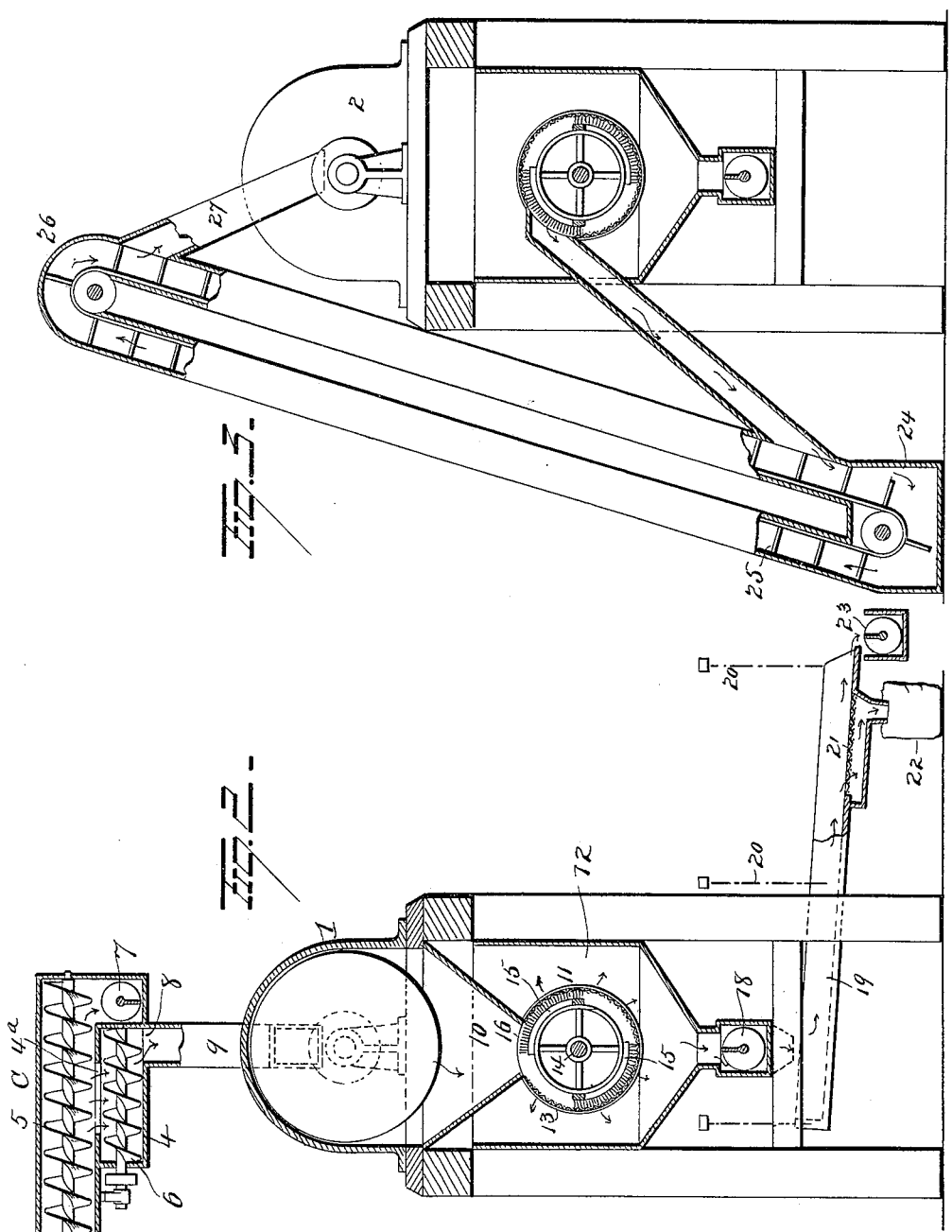

UNITED STATES PATENT OFFICE.

WILLIAM CUMMING JOHNSON, OF MEMPHIS, TENNESSEE.

MEANS FOR SEPARATING FIBER FROM COTTON-SEED HULLS.

SPECIFICATION forming part of Letters Patent No. 613,208, dated October 25, 1898.

Application filed October 8, 1897. Serial No. 654,550. (No model.)

*To all whom it may concern:*

Be it known that I, WILLIAM CUMMING JOHNSON, of Memphis, in the county of Shelby and State of Tennessee, have invented certain new and useful Improvements in Means for Separating the Fiber from Cotton-Seed Hulls; and I do hereby declare the following to be a full, clear, and exact description of the invention, such as will enable others skilled in the art to which it appertains to make and use the same.

My invention relates to an improvement in means for separating the fiber from cotton-seed, one object of the invention being to provide simple and efficient feed devices whereby the cotton-seed hulls can be fed rapidly and uniformly into the apparatus.

A further object is to construct and arrange the apparatus in such manner that all the cotton fiber will be separated from the hulls in a quick, economical, and effectual manner.

With these objects in view the invention consists in certain novel features of construction and combinations and arrangements of parts of apparatus, as well as certain novel steps in the process of treating cotton-seed hulls for removing the fiber therefrom, as hereinafter set forth, and pointed out in the claims.

In the accompanying drawings, Figure 1 is an elevation of an apparatus embodying my improvements. Figs. 2 and 3 are cross-sectional views.

A represents one floor of a building, and B another floor. On the upper floor a series of from one to ten attrition-mills 1 2 are located, two of such mills being shown in the drawings, and the successive mills are adjusted to crush the hulls to different degrees of fineness, as hereinafter more fully explained.

It is desirable that the cotton-seed hulls from which the fiber is to be separated be fed rapidly and uniformly to the apparatus, and for this purpose I provide a feeding device C, comprising a trough or hopper 3, having an outlet 4ᵃ at or near one end adapted to discharge into a smaller trough or hopper 4, a screw conveyer 5 in the larger trough and a smaller screw conveyer 6 in the smaller trough. The smaller trough is closed at its ends, and adjacent to one of said closed ends the trough 4 is provided in its bottom with an outlet 8, which communicates with a chute 9, the latter constituting in effect an angular extension of said trough 4. From this construction and arrangement of parts it will be seen that the larger screw conveyer will maintain the smaller trough at all times filled with material, and that the material will therefore be discharged from the smaller trough uniformly and at the full capacity of the smaller conveyer 6. The surplus material which cannot be forced by the larger conveyer into the trough or hopper of the smaller conveyer will pass on through the end of the trough or hopper 3 and may be again returned to the inlet end of said trough or hopper by means of a conveyer 7 or in any other desired manner.

The material discharged from the outlet 8 of the smaller trough or hopper 4 will flow rapidly through a chute 9 to the attrition-mill 1, by means of which latter the hulls of the seed will be crushed or broken and the cotton fiber partially separated therefrom. The crushed hulls and fiber will be discharged from the mill 1 through a chute 10 directly into the open end of a separator 11, located in a hopper 12 directly under said mill. A similar hopper having a separator located therein is also located under the mill 2 and under all the mills which it may be desired to employ. The sides and ends of each hopper and the ends of each separator are closed, and each hopper is adapted to discharge to a screw conveyer 18, as hereinafter more fully explained. Each separator comprises a cylinder 13, made of steel or other suitable material and provided throughout its periphery with small perforations. A shaft 14 is mounted to pass through each cylinder and is provided with spirally-arranged blades or arms 15, having brushes 16 at their outer edges adapted to wipe the inner face of the cylinder. The shafts 14 of the respective separators are connected together by means of couplings 17, so that all of said separators can be operated simultaneously by means of a single belt and pulley. The perforated cylinders are suitably supported in a fixed position within the hoppers 12, so that when the crushed hulls from the attrition-mills are forced through the chute directly into separator 11 the particles of loosened hull pass through the perforations in the cylindrical steel covering of the separator and fall into the conveyer 18, by which they will be conveyed to a shaking-table 19. The particles of hull thus conveyed to the shaking-table may have small particles of short fiber adhering to them, and to recover this the shaking-table (which may be conveniently suspended by means of chains 20 in an inclined position) can be reciprocated in any suitable manner, so as to cause the particles of hull to settle upon the table and gradually find their way down to the lower end thereof, where they will pass through a screen 21 into a bag 22 or other suitable receptacle. The fine short cotton fiber will pass off the end of the table into a conveyer 23, by which it may be carried to the second attrition-mill or to a furnace to be used as fuel.

The main body of the mixed crushed hull and fiber discharged from the first attrition-mill will be carried by the spiral arms and brushes of the first separator to one end of the latter, from which it will be discharged into an elevator-boot 24. From the boot 24 the mixed hull and fiber will be conducted by means of an elevator 25 to an elevator-head 26, where it will be discharged into an inclined chute 27, and by said chute be conducted to and fed into the second attrition-mill 2. The second mill 2 is, as above intimated, adjusted to grind the hulls and kernels finer than the first mill, so that the particles of hull and kernel which failed to pass through the first separator and finally reach the shaking-table will be ground finer by the second attrition-mill, and the mixed hull, kernel, and fiber will be discharged from the second mill to the second separator, where they will be acted upon in the manner above described, the particles of hull and kernel passing through the perforated cylinder to the conveyer to be deposited by the latter onto the shaking-table, and the fiber freed from said particles of hull and kernel discharges at the far end of the said second separator.

The fiber after passing through the second separator may, if desired, be passed through another mill and separator or through several more mills and separators, according to the quality of the fiber desired.

By means of my improved apparatus I am enabled to obtain a clean cotton fiber suitable for use in manufacturing and in the arts and also a perfectly clean bran from the cotton-seed hulls and kernels, which will make excellent feed for stock.

My improvements are simple in construction, comprise comparatively few parts, are automatic in operation, and are effectual in every respect in the performance of their functions.

Various slight changes might be made in the details of construction of my invention without departing from the spirit thereof or limiting its scope, and hence I do not wish to limit myself to the precise details of construction herein set forth.

Having fully described my invention, what I claim as new, and desire to secure by Letters Patent, is—

1. In an apparatus of the class described, the combination with a large conveyer having a discharge-opening in its bottom and an open end, of a smaller conveyer arranged beneath the large conveyer and adapted to receive material therefrom through said discharge-opening a chute, said second conveyer extending into the chute whereby to force material to the machines so that the entire apparatus shall always receive its full capacity uniformly while the surplus or overflow is carried on by the large conveyer, substantially as set forth.

2. In an apparatus of the class described, a feeding device comprising a large trough, a conveyer therein, a smaller trough under the large trough and communicating therewith, said smaller trough having a closed end and a discharge-outlet adjacent to said closed end, a chute communicating with the discharge-outlet of the smaller trough, and a conveyer in said smaller trough, said conveyer extending over the inlet of the chute at the closed end of said smaller chute, substantially as set forth.

3. In an apparatus of the class described, the combination with a series of attrition-mills arranged on the same level, of hoppers under said mills, a separator in each of said hoppers, a screw conveyer into which said hoppers discharge, an inclined shaking-table onto which said screw conveyer discharges, and a screen at the lower end of said shaking-table, substantially as set forth.

4. In an apparatus for separating fiber from the hulls of cotton-seed, the combination with a series of attrition-mills and hopper under each of said mills, of means for feeding and forcing material to the first mill, separators in each of said hoppers adapted to receive material therefrom, an elevator adapted to receive material from one separator and convey it to the mill over the succeeding separator, a conveyer in the bottom of said trough, an inclined shaking-table onto which said conveyer is adapted to discharge, and means for operating all the separators simultaneously, substantially as set forth.

In testimony whereof I have signed this specification in the presence of two subscribing witnesses.

WILLIAM CUMMING JOHNSON.

Witnesses:
CHAS. B. BROOKS,
CHAS. A. CRONE.